(12) United States Patent
Sato

(10) Patent No.: US 11,225,537 B2
(45) Date of Patent: Jan. 18, 2022

(54) ETHYLENE-VINYL ALCOHOL COPOLYMER AND PROCESS FOR PRODUCING SAID ETHYLENE-VINYL ALCOHOL COPOLYMER

(71) Applicant: MITSUBISHI CHEMICAL CORPORATION, Tokyo (JP)

(72) Inventor: Nobuaki Sato, Osaka (JP)

(73) Assignee: MITSUBISHI CHEMICAL CORPORATION, Tokyo (JP)

( * ) Notice: Subject to any disclaimer, the term of this patent is extended or adjusted under 35 U.S.C. 154(b) by 0 days.

(21) Appl. No.: 16/065,323

(22) PCT Filed: Dec. 19, 2016

(86) PCT No.: PCT/JP2016/087817
§ 371 (c)(1),
(2) Date: Jun. 22, 2018

(87) PCT Pub. No.: WO2017/110752
PCT Pub. Date: Jun. 29, 2017

(65) Prior Publication Data
US 2019/0100610 A1   Apr. 4, 2019

(51) Int. Cl.
| C08F 210/02 | (2006.01) |
| C08F 216/06 | (2006.01) |
| C08F 8/12   | (2006.01) |
| C08F 218/08 | (2006.01) |

(52) U.S. Cl.
CPC .............. *C08F 210/02* (2013.01); *C08F 8/12* (2013.01); *C08F 216/06* (2013.01); *C08F 218/08* (2013.01); *C08F 2800/10* (2013.01)

(58) Field of Classification Search
CPC ......... C08F 216/06; C08F 8/12; C08F 218/08
See application file for complete search history.

(56) References Cited

U.S. PATENT DOCUMENTS

| 3,985,719 | A | 10/1976 | Hoyt et al. |
| 5,032,632 | A | 7/1991 | Saxton |
| 5,349,023 | A | 9/1994 | Ikeda et al. |
| 5,470,662 | A | 11/1995 | Weber et al. |
| 5,718,734 | A | 2/1998 | Davies |
| 6,277,477 | B1 * | 8/2001 | Tracy .................. B41M 5/5254 427/105 |
| 2005/0107507 | A1 | 5/2005 | Ikeda et al. |
| 2005/0215733 | A1 * | 9/2005 | Tsai ........................ C08F 6/003 526/68 |
| 2007/0106031 | A1 | 5/2007 | Uchiumi et al. |
| 2009/0071063 | A1 * | 3/2009 | Perrier ................... C10L 1/026 44/308 |
| 2009/0215942 | A1 | 8/2009 | Ikeda et al. |
| 2009/0326124 | A1 | 12/2009 | Ikeda et al. |
| 2010/0080943 | A1 | 4/2010 | Uradnisheck |

FOREIGN PATENT DOCUMENTS

| CN | 1056509 A | 11/1991 |
| CN | 101759944 A | 6/2010 |
| CN | 102171282 A | 8/2011 |
| EP | 0546570 A1 | 6/1993 |
| EP | 1612228 A1 | 1/2006 |
| JP | H04-304204 A | 10/1992 |
| JP | H05-214018 A | 8/1993 |
| JP | H06-345811 A | 12/1994 |
| JP | H07-157506 A | 6/1995 |
| JP | H07-508775 T | 9/1995 |
| TW | 2005-000203 A | 1/2005 |
| WO | 2004/092234 A1 | 10/2004 |

OTHER PUBLICATIONS

Amiya, Shigetoshi, End group analysis of poly(vinyl alcohol) by high resolution NMR spectra (I), Chemistry Express / Chem. Express, vol. 1 Issue: 2, pp. 69-71, Publication Date: 1986.*
Okaya et al., "Polyvinyl Alcohol", ed. by C.A. Finch, John Wiley & Sons, 1973, pp. 204-206.
International Search Report issued with respect to Patent Application No. PCT/JP2016/087817, dated Feb. 14, 2017.
International Preliminary Report on Patentability issued with respect to Patent Application No. PCT/JP2016/087817, dated Jun. 26, 2017.
Extended European Search Report dated May 9, 2019 in European Application No. 16878641.6.
Singapore Office Action dated Jun. 14, 2019 in corresponding Singapore Application No. 11201804958T.
Chinese Office Action issued in CN Patent Application No. 201680076196.X, dated Mar. 5, 2020, English translation.
Office Action issued in JP Patent Application No. 2016-574476 dated Apr. 21, 2020, English translation.
Taiwanese OA issued in Patent App. No. TW 105142850, dated Jul. 23, 2020, English translation.
Chinese OA issued in CN Patent App. No. 201680076196.X, dated Dec. 7, 2020, English translation.
Taiwanese OA issued in Patent App. No. TW 105142850, dated Nov. 25, 2020, English translation.
Chinese OA issued in CN Patent App. No. Tw 201680076196.X, dated Dec. 7, 2020, English translation.

* cited by examiner

*Primary Examiner* — Jeffrey C Mullis

(74) *Attorney, Agent, or Firm* — Greenblum & Bernstein, P.L.C.

(57) ABSTRACT

The present invention provides an ethylene-vinyl alcohol copolymer which can be melt-molded at lower temperatures than conventional ethylene-vinyl alcohol copolymers to give molded objects that are inhibited from suffering undesirable coloration or having fish-eyes and that have excellent gas barrier properties. The ethylene-vinyl alcohol copolymer of the invention has a carboxylic acid ester group at a polymer terminal.

4 Claims, 4 Drawing Sheets

ETHYLENE-VINYL ALCOHOL COPOLYMER AND PROCESS FOR PRODUCING SAID ETHYLENE-VINYL ALCOHOL COPOLYMER

TECHNICAL FIELD

The present invention relates to a novel ethylene-vinyl alcohol copolymer and a process for producing the ethylene-vinyl alcohol copolymer.

BACKGROUND ART

Ethylene-vinyl alcohol copolymers (hereinafter often referred to as "EVOH resins") are apt to be aligned because of the structure thereof and have exceedingly high intermolecular force due to the hydrogen bonding between hydroxyl groups present in polymer side chains. EVOH resins are hence highly crystalline, and even the amorphous portions thereof have high intermolecular force. Molecules of gases including oxygen are hence less apt to permeate EVOH resins. Consequently, films and the like obtained from EVOH resins show excellent gas barrier properties.

Owing to the excellent gas barrier properties, EVOH resins are utilized as shaped products such as films or sheets, e.g., food-packaging materials, medicine-packaging materials, industrial-chemical-packaging materials, and agrochemical-packaging materials, and containers, e.g., bottles.

Usually, an EVOH resin is produced by copolymerizing ethylene and a fatty acid-vinyl ester such as vinyl acetate and saponifying the resultant ethylene-vinyl ester copolymer at a high temperature and a high pressure in the presence of an alkali catalyst using an alcohol, e.g., methanol, as a solvent.

In molding an EVOH resin, pellets of the EVOH resin are introduced into an extrusion molding machine or the like and melt-molded into the shape of a film, sheet, etc. There are cases where such molded products have an impaired appearance, depending on the properties of the EVOH resin. For example, in cases when the EVOH resin is exposed to a high temperature (e.g., 200° C. or higher), heat deterioration products and crosslinking products are prone to be formed, and there are hence cases where foreign matter derived from these products comes into the molded object or fish-eyes (fine particles of resin) are formed. Especially in the case where the EVOH resin stagnates in a portion of the extrusion molding machine, this EVOH resin is prone to be affected thereby so that the EVOH resin stagnating in the portion is continuously heated and deteriorates thermally, forming a cause of foreign matter or fish-eyes.

A possible method for inhibiting the formation of heat deterioration products and crosslinking products during the molding may be to melt-mold the EVOH resin at a temperature as low as possible. However, for melt-molding the EVOH resin at a low temperature, it is necessary to lower the melting point of the EVOH resin. Examples of methods for lowering the melting point of an EVOH resin include to increase the ethylene content, to reduce the degree of saponification, and to add a plasticizer.

Non-Patent Document 1, for example, describes a relationship between ethylene content and melting point and a relationship between the degree of saponification and melting point, in EVOH resins. The document indicates that the melting point decreases as the ethylene content increases or the degree of saponification decreases.

Techniques for improving the thermal stability of an EVOH resin have been proposed. For example, Patent Document 1 proposes an ethylene-vinyl alcohol copolymer including ethylene units (III), vinyl alcohol units (IV), and vinyl ester units (V), wherein the proportion of the ethylene units (III) to the sum of those units (III+IV+V) is 20-60% by mole and the total proportion (I+II) of a carboxylic acid unit (I) and a lactone ring unit (II) which are present at polymer terminals of the copolymer to the sum of those units (III+IV+V) is 0.12% by mole or less. Patent Document 1 indicates that according to the proposed technique, an EVOH resin which has excellent suitability for long run in melt molding and is less apt to suffer the formation of fish-eyes or hard spots during heat treatment or molding is obtained.

PRIOR ART DOCUMENTS

Patent Document

Patent Document 1: International Publication WO 2004/092234

Non-Patent Document

Non-Patent Document 1: T. Okaya and K. Ikari, *POLYVINYL ALCOHOL*, ed. by C. A. Finch, John Wiley & Sons, 1973, pp. 204-206

SUMMARY OF THE INVENTION

Problems that the Invention is to Solve

However, the EVOH resins of Non-Patent Document 1 which have been increased in ethylene content or reduced in the degree of saponification in order to lower the melting point each tend to show reduced gas barrier properties. In the case of the EVOH resins having an increased ethylene content, these resins have a reduced intermolecular bonding force because the ethylene moieties have no hydrogen bonding, and gas molecules and the like are prone to permeate these portions. In the case of the EVOH resins having a reduced degree of saponification, acetyl groups undesirably remain in the EVOH resins, leaving portions which are less apt to be crystallized. In the case of adding a plasticizer, portions which are less apt to be crystallized remain undesirably because the plasticizer comes into the crystals. Thus, each technique results in a decrease in gas barrier property.

Meanwhile, the technique of Patent Document 1 is for improving thermal stability by regulating the structure of polymer terminals and is not intended to lower the melting point of an EVOH resin.

There is hence a desire for an ethylene-vinyl alcohol copolymer which can be melt-molded at lower temperatures than conventional ethylene-vinyl alcohol copolymers to give molded objects that are inhibited from suffering undesirable coloration or having fish-eyes and that have excellent gas barrier properties.

Means for Solving the Problem

The present inventor diligently made investigations under such circumstances and, as a result, has discovered that the ethylene-vinyl alcohol copolymer including a specific organic group at a polymer terminal provides desired effects and has accomplished the present invention.

The present invention includes the following configurations (1) to (6).
(1) An ethylene-vinyl alcohol copolymer comprising: a carboxylic acid ester group at a polymer terminal.

(2) The ethylene-vinyl alcohol copolymer according to (1), wherein a content of the carboxylic acid ester group is 0.01-0.2% by mole based on a total amount of monomer units in the copolymer.

(3) The ethylene-vinyl alcohol copolymer according to (1) or (2) comprising; a carboxylic acid group, a carboxylic acid salt group, or a lactone ring group at a polymer terminal, wherein a content of the carboxylic acid ester group is 5-45% by mole based on a total amount of the carboxylic acid ester group, the carboxylic acid group, the carboxylic acid salt group, and the lactone ring group.

(4) The ethylene-vinyl alcohol copolymer according to any one of (1) to (3), wherein the carboxylic acid ester group is a carboxylic acid alkyl ester group.

(5) A process for producing the ethylene-vinyl alcohol copolymer according to any one of (1) to (4), comprising: a step of copolymerizing ethylene and a vinyl ester monomer to obtain a copolymer and a step of performing a saponification reaction in a nonaqueous system using a saponification catalyst, wherein the step of performing the saponification reaction employs an alkali metal alkoxide as the saponification catalyst.

(6) The process for producing the ethylene-vinyl alcohol copolymer according to (5), wherein the step of performing the saponification reaction is conducted in the presence of an alcohol solvent containing no water.

Effects of the Invention

According to the present invention, an ethylene-vinyl alcohol copolymer having a low melting point can be provided. Use of the ethylene-vinyl alcohol copolymer of the invention hence renders low-temperature melt molding possible, thereby making it possible to inhibit thermal deterioration during melt molding to prevent coloring. Furthermore, a molded object having excellent gas barrier properties can be obtained.

MODES FOR CARRYING OUT THE INVENTION

Figure 1:
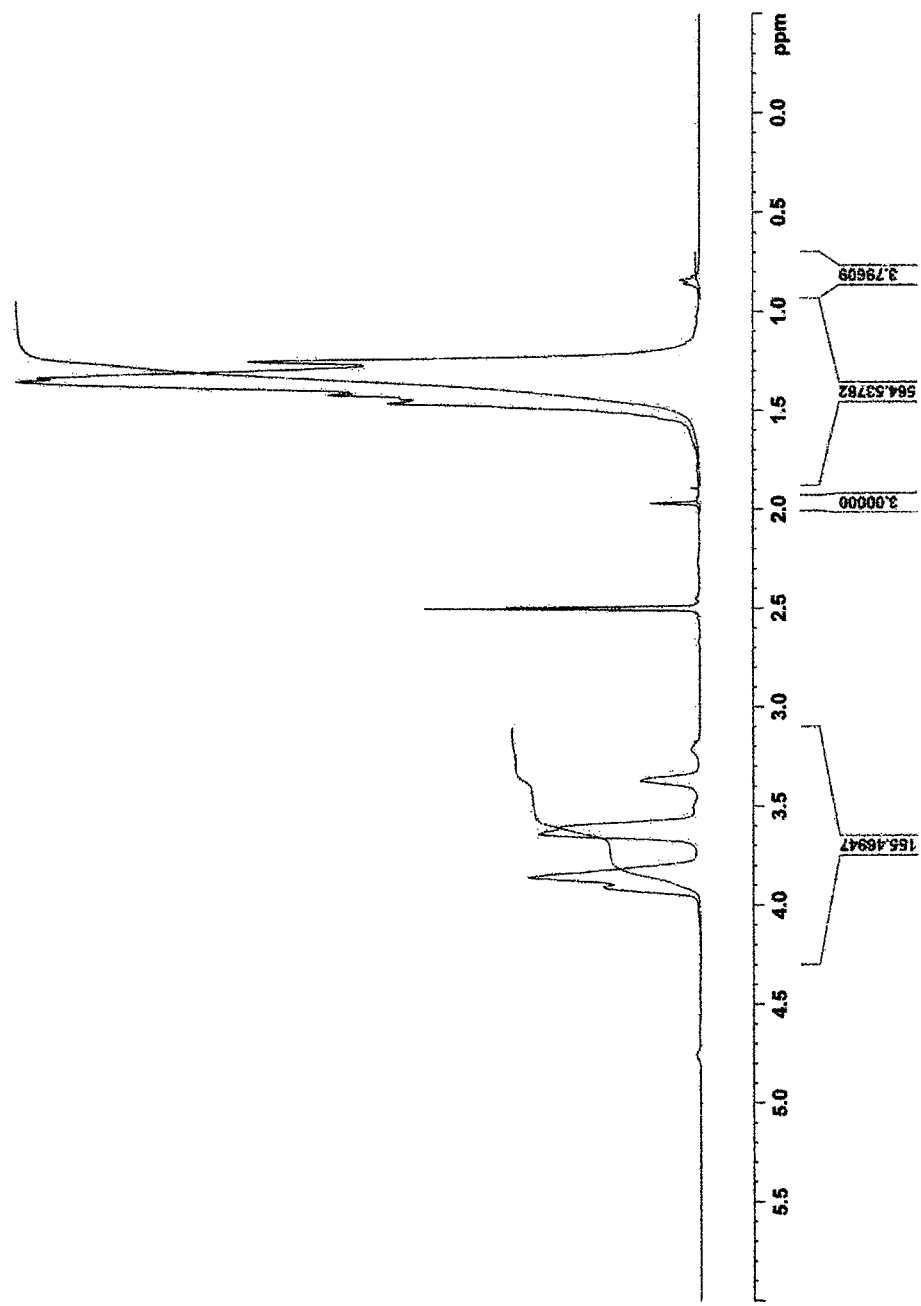
FIG. 1 shows a $^1$H-NMR chart (solvent: heavy dimethyl sulfoxide (DMSO-D6)) of the EVOH resin obtained in Example 1.

The configurations of the present invention are explained below in detail. However, the following explanations are on preferred embodiments, and the invention is not limited to the contents thereof.

The ethylene-vinyl alcohol copolymer (EVOH resin) of the invention has a carboxylic acid ester group at a polymer terminal.

The term "polymer terminal" in the invention means a terminal of the main chain where the structure composed of repeating monomer units (hereinafter, the structure is often referred to as "monomer units") ends.

The polymer terminals of an EVOH resin are usually any of a methyl group, a hydroxyl group, and carboxylic acid groups and analogues thereof (carboxylic acid groups, carboxylic acid salt groups, and lactone ring groups). It has been discovered that an EVOH resin which has a carboxylic acid ester group as a carboxylic acid group analogue at a polymer terminal has a lowered melting point and is capable of being melt-molded at low temperatures as in the present invention.

The presence of a carboxylic acid ester group at a polymer terminal exerts little influence on the crystallization of the EVOH resin, and it is presumed that the terminal group does not impair the gas barrier properties of the molded objects to be obtained.

The carboxylic acid ester group is not particularly limited, and examples thereof include carboxylic acid alkyl ester groups such as carboxylic acid methyl ester groups, carboxylic acid ethyl ester groups, carboxylic acid butyl ester groups, and carboxylic acid ethylhexyl ester groups. However, the carboxylic acid ester group does not include any cyclic ester group such as a lactone ring group. Preferred of these are carboxylic acid alkyl ester groups in each of which the alkoxy group has 1-3 carbon atoms, from the standpoint that carboxylic acid ester groups having low steric hindrance so as not to adversely affect the crystallinity of the EVOH resin are preferred. More preferred are carboxylic acid methyl ester groups.

The content of the polymer-terminal carboxylic acid ester group is preferably 0.01-0.2% by mole based on the total amount of the monomer units in the ethylene-vinyl alcohol copolymer. Too high contents of the carboxylic acid ester group tend to result in a decrease in the gas barrier properties of the EVOH resin. Too low contents of the carboxylic acid ester group tend to result in an insufficient reduction in melting point. The content of the carboxylic acid ester group is more preferably 0.02-0.15% by mole, even more preferably 0.03-0.1% by mole.

The expression "monomer units in the ethylene-vinyl alcohol copolymer" means ethylene units, vinyl alcohol units, vinyl ester units derived from a vinyl ester monomer and remaining unsaponified in some cases, and units of other copolymerized monomers. The expression "total amount of the monomer units" means the total number of moles of those units.

In the present invention, the content of the carboxylic acid ester group, based on the total amount of the polymer-terminal carboxylic acid ester group, carboxylic acid group, carboxylic acid salt group, and lactone ring group in the EVOH resin, is preferably 5-45% by mole. In case where the content of the carboxylic acid ester group based on the total amount of the carboxylic acid ester group, carboxylic acid group, carboxylic acid salt group, and lactone ring group is too high, the EVOH resin tends to have reduced gas barrier properties. Conversely, too low contents thereof tend to result in an insufficient reduction in melting point. The content of the carboxylic acid ester group is more preferably 10-40% by mole, even more preferably 15-30% by mole, especially preferably 15-20% by mole.

The content of the polymer-terminal carboxylic acid ester group based on the total amount of the monomer units in the ethylene-vinyl alcohol copolymer and the content of the carboxylic acid ester group based on the total amount of the polymer-terminal carboxylic acid ester group, carboxylic acid group, carboxylic acid salt group, and lactone ring group, in the invention, can be obtained usually by analyzing the ethylene-vinyl alcohol copolymer for various contents using nuclear magnetic resonance spectroscopy (NMR) to determine or calculate the desired contents.

<Analysis Methods>

(1-1) Determination of Terminal Methyl Group Content

The EVOH resin is examined by $^1$H-NMR spectroscopy (solvent, heavy dimethyl sulfoxide (DMSO-D6); examined at 50° C.) using "400 MHz NMR" (manufactured by Bruker Biospin K.K.), and the content is calculated using the resultant chart.

Specifically, the content of terminal methyl groups is calculated using the following equation 1 from the integral ($I_{Me-1}$) of a peak of terminal methyl groups at 0.7-0.95 ppm, the integral ($I_{CH2}$) of peaks of non-terminal methylene (sum of the methylene groups of ethylene units, vinyl alcohol units, and vinyl acetate units) at 0.95-1.85 ppm, the integral ($I_{OAc}$) of a peak of the terminal methyl groups in vinyl acetate units at 1.9-2 ppm, and the integral ($I_{CH}$) of a peak of the methine in vinyl alcohol units at 3.1-4.3 ppm in the NMR chart, an example of which is shown in FIG. 1.

Content of terminal methyl groups (% by mole)=
$(I_{Me-1}/3)/[(I_{Me-1}/3)+(I_{OAc}/3)+I_{CH}+\{I_{CH2}-2\times I_{CH}-2\times(I_{OAc}/3)-2\times(I_{Me-1}/3)\}/4]$ (Equation 1)

(1-2) Determination of Carboxylic Acid Ester Group Content (Y)

Figure 2:
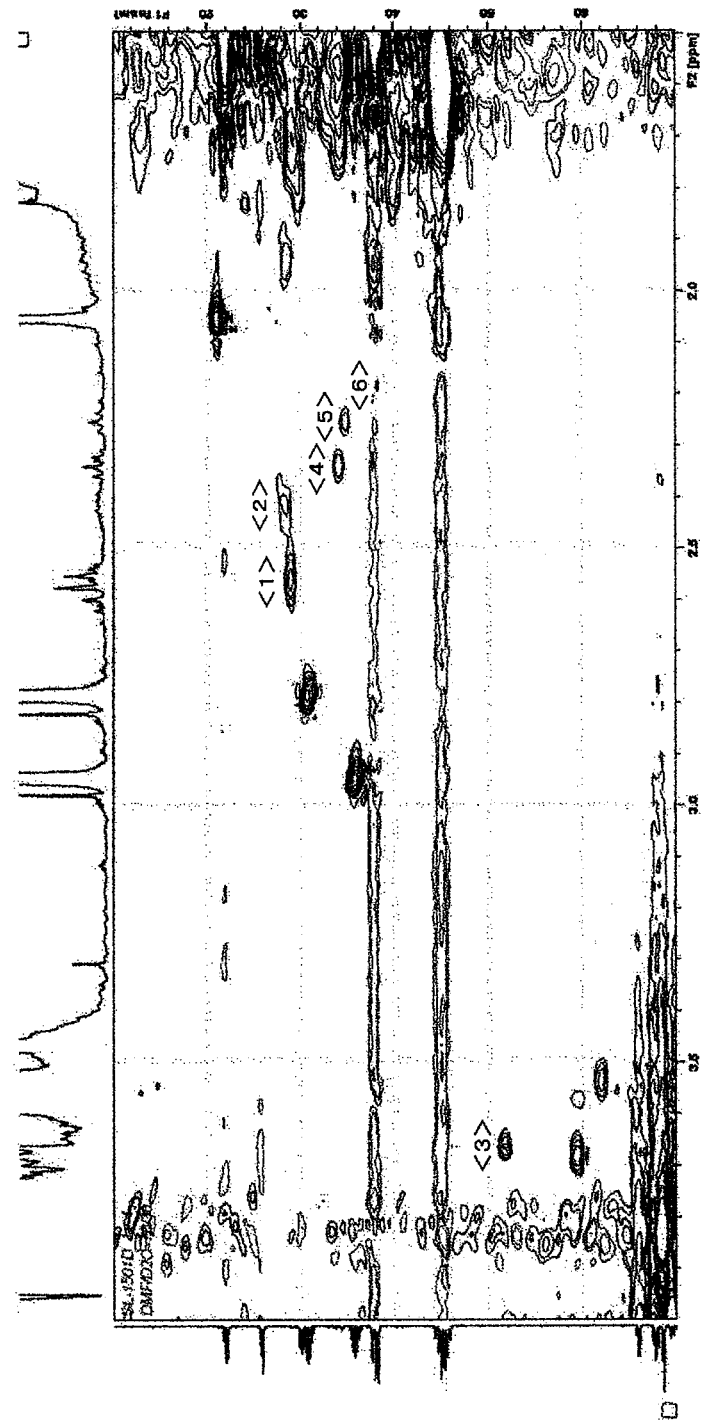
FIG. 2 shows a $^1$H-$^{13}$C HSQC chart (solvent: heavy dimethylformamide (DMF)/heavy water=70/30) of the EVOH resin obtained in Example 1.

The EVOH resin is examined by $^1$H-$^{13}$C HSQC spectroscopy (solvent, heavy DMF/heavy water=70/30 (by weight)) using examination apparatus "400 MHz NMR" (manufactured by Bruker Biospin K.K.), and the resultant chart is used. Specifically, in the two-dimensional NMR chart, an example of which is shown in FIG. 2: <1> and <2> are correlation peaks assigned to terminal lactone ring groups; <3> and <4> are correlation peaks assigned to terminal carboxylic acid ester groups; <5> is a correlation peak assigned to terminal carboxylic acid groups; and <6> is a correlation peak assigned to terminal carboxylic acid salt groups. By ascertaining the presence of the correlation peaks <3> and <4>, the presence of terminal carboxylic acid ester groups is ascertained.

The content of carboxylic acid ester groups (Y) is calculated from: a chart obtained by examining the EVOH resin by $^1$H-NMR spectroscopy (solvent, heavy DMF/heavy water=70/30 (by weight); examined at 80° C.) with examination apparatus "400 MHz NMR" (manufactured by Bruker Biospin K.K.); and the content of terminal methyl groups obtained in (1-1) above. The chemical shift values are based on the 0-ppm peak of TMS.

Figure 3:
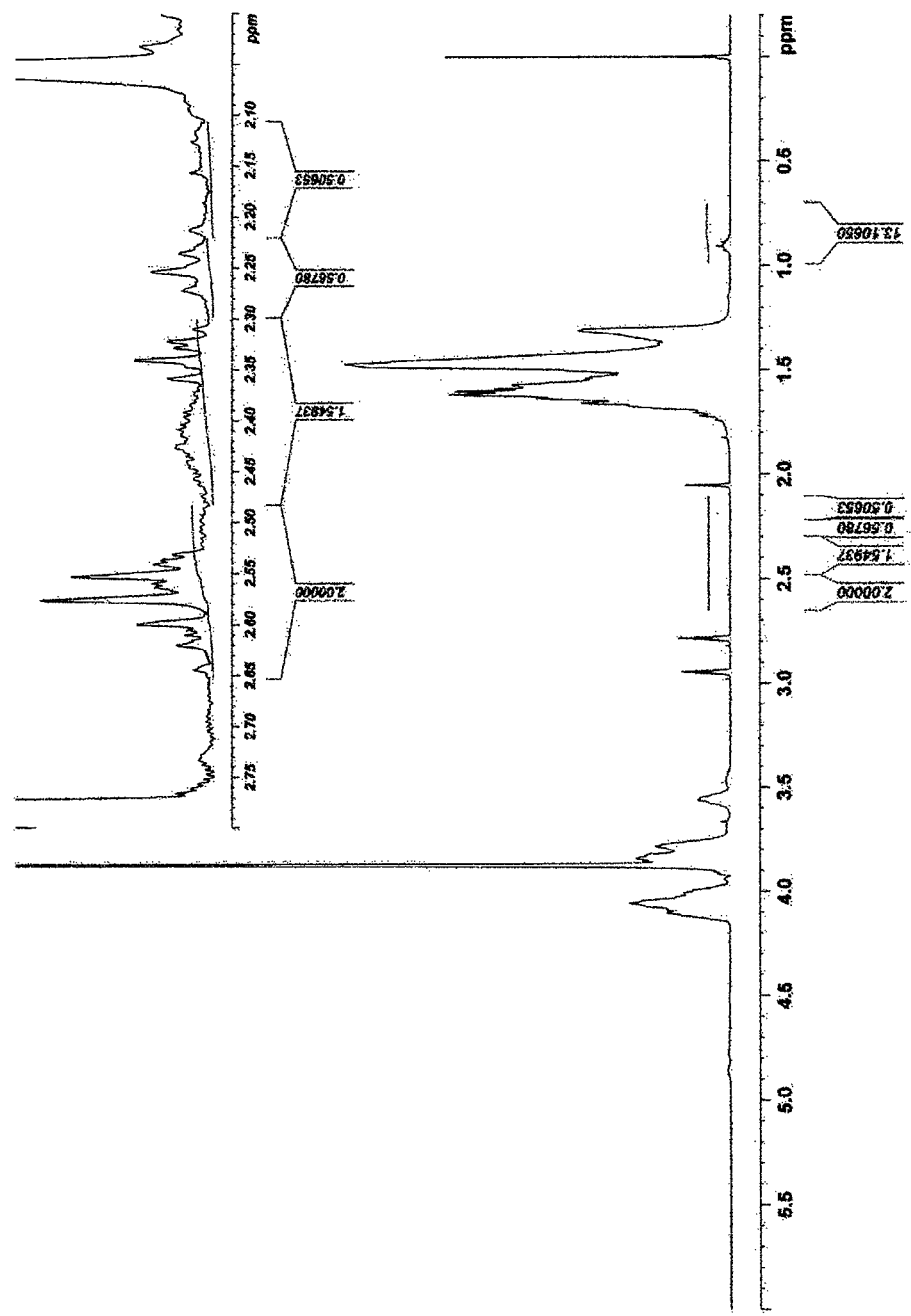
FIG. 3 shows a $^1$H-NMR chart (solvent: heavy dimethylformamide (DMF)/heavy water=70/30) of the EVOH resin obtained in Example 1.

Specifically, the content of carboxylic acid ester groups (Y) (% by mole) is calculated using the following equation 2 from the integral ($I_{Me-2}$) of a peak of terminal methyl groups at 0.7-1 ppm, the integral ($I_y$) of a peak at 2.30-2.48 ppm, and the integral ($I_x$) of a peak at 2.48-2.65 ppm in the NMR chart, an example of which is shown in FIG. 3.

Content of carboxylic acid ester groups (Y) (% by mole)=[content of terminal methyl groups (% by mole)]$\times[(I_y-I_x/2)/2]/(I_{Me-2}/3)$ (Equation 2)

(1-3) Determination of Content of Carboxylic Acid Ester Groups (Q) Based on the Sum (P) of Content of Carboxylic Acid Ester Groups (Y), Content of Carboxylic Acid Groups (Z), Content of Carboxylic Acid Salt Groups (W), and Content of Lactone Ring Groups (X)

The content of carboxylic acid ester groups (Q) based on the sum (P) is calculated using a chart obtained by examining the EVOH resin by $^1$H-NMR spectroscopy (solvent, heavy DMF/heavy water=70/30 (by weight); examined at 80° C.) with examination apparatus "400 MHz NMR" (manufactured by Bruker Biospin K.K.). The chemical shift values are based on the 0-ppm peak of TMS.

Specifically, the content (Q) (% by mole) of carboxylic acid ester groups (Y) based on the sum (P) of the carboxylic acid ester groups (Y), carboxylic acid groups (Z), carboxylic acid salt groups (W), and lactone ring groups (X) is calculated using the following equation 3 from the integral ($I_y$) of a peak at 2.30-2.48 ppm, the integral ($I_z$) of a peak at 2.22-2.30 ppm, the integral ($I_w$) of a peak at 2.1-2.22 ppm, and the integral ($I_x$) of a peak at 2.48-2.65 ppm in the NMR chart, an example of which is shown in FIG. 3.

Content of carboxylic acid ester groups (Q) (% by mole) based on the sum $(P)=[(I_y-I_x/2)/2]/[I_x/2+(I_y-I_x/2)/2+I_z/2+I_w/2]$ (Equation 3)

The content of carboxylic acid groups (Z) based on the sum (P), the content of carboxylic acid salt groups (W) based on the sum (P), and the content of lactone ring groups (X) based on the sum (P) can be determined from the values for the respective peaks obtained in (1-3) above.

The content of carboxylic acid groups (Z) based on the sum (P) is usually 5-20% by mole, preferably 10-20% by mole.

The content of carboxylic acid salt groups (W) based on the sum (P) is usually 5-20% by mole, preferably 15-20% by mole.

The content of lactone ring groups (X) based on the sum (P) is usually 30% by mole or higher but less than 55% by mole, and is preferably 40-50% by mole.

In cases when the contents are within those ranges, the effects of the invention tend to be more efficiently obtained.

The content of ethylene units (ethylene content) in the EVOH resin of the invention is preferably 20-60% by mole based on the total number of moles of the monomer units in the ethylene-vinyl alcohol copolymer. Too low ethylene contents result in an increase in melting point, and this tends to result in the necessity of melt-molding the EVOH resin at a temperature around the heat decomposition temperature or a higher temperature, giving molded objects having an impaired appearance due to, for example, thermal deterioration during the molding. Meanwhile, too high ethylene contents tend to result in reduced gas barrier properties. The ethylene content is more preferably 25-50% by mole, even more preferably 25-45% by mole.

The ethylene content can be determined in accordance with, for example, ISO 14663-1 (1999).

Examples of processes for producing the EVOH resin of the invention include: a process in which an ethylene-vinyl ester copolymer is saponified to obtain an EVOH resin so that polymer-terminal carboxylic acid ester groups remain; and a process in which carboxylic acid groups and/or carboxylic acid salt groups formed at polymer terminals of an EVOH resin are esterified.

Preferred of these is a process in which ethylene is copolymerized with a vinyl ester monomer and the resultant ethylene-vinyl ester copolymer is saponified to obtain an EVOH resin in such a manner that the saponification is conducted using a sodium alkoxide as a saponification catalyst in the presence of an alcohol solvent containing substantially no water and that after the saponification reaction, the sodium alkoxide remaining in the system is neutralized with an acid to terminate the saponification reaction to thereby cause polymer-terminal carboxylic acid ester groups to remain. The expression "containing substantially no water" means that the solvent has a water content of 0% by weight or the solvent unavoidably contains water in an amount of 0.1% by weight or less.

[Ethylene-Vinyl Ester Copolymer]

In producing the ethylene-vinyl alcohol copolymer (EVOH resin) of the invention, ethylene is first polymerized (reacted) with one or more vinyl ester monomers in the presence of a polymerization solvent, a polymerization catalyst (polymerization initiator), etc. to obtain an ethylene-vinyl ester copolymer.

For the polymerization, any known polymerization method may be used, such as, for example, solution polymerization, suspension polymerization, emulsion polymerization, or bulk polymerization. In general, solution polymerization is used. The polymerization may be either continuous or batchwise.

<Vinyl Ester Monomers>

Vinyl acetate is representatively used as a vinyl ester monomer, from the standpoints that this monomer is easily available on the market and that the efficiency of treatment for impurity removal therefrom during production is high. Other examples include aliphatic vinyl esters such as vinyl formate, vinyl propionate, vinyl valerate, vinyl butyrate, vinyl isobutyrate, vinyl pivalate, vinyl caprate, vinyl laurate, vinyl stearate, and vinyl Versatate and aromatic vinyl esters such as vinyl benzoate. Use may be made of aliphatic vinyl esters each having usually 3-20 carbon atoms, preferably 4-10 carbon atoms, especially preferably 4-7 carbon atoms. One of these vinyl ester monomers is usually used alone, but two or more thereof may be simultaneously used according to need.

<Polymerization Solvent>

Examples of the polymerization solvent usually include lower alcohols such as methanol, ethanol, propanol, and butanol and ketones such as acetone and methyl ethyl ketone. One of such compounds may be used alone, or two or more thereof may be used in combination. Industrially, methanol is suitable for use as the polymerization solvent.

The amount of the polymerization solvent to be used may be suitably selected while taking account of the chain transfer constant of the polymerization solvent, in accordance with the desired degree of polymerization of the copolymer. For example, in the case where the polymerization solvent is methanol, a solvent amount is selected from a range where the S (polymerization solvent)/M (monomers) is about from 0.01-10 (weight ratio), preferably about from 0.05-7 (weight ratio).

<Polymerization Catalyst>

Examples of the polymerization catalyst include known radical polymerization catalysts, such as azobisisobutyronitrile, acetyl peroxide, benzoyl peroxide, and lauryl peroxide, and low-temperature-active radical polymerization catalysts. Examples of the low-temperature-active radical polymerization catalysts include: organic peroxides such as peroxyesters, e.g., t-butyl peroxyneodecanoate, t-butyl peroxypivalate, α,α'-bis(neodecanoylperoxy)diisopropylbenzene, cumyl peroxyneodecanoate, 1,1,3,3-tetramethylbutyl peroxyneodecanoate, 1-cyclohexyl-1-methylethyl peroxyneodecanoate, t-hexyl peroxyneodecanoate, and t-hexyl peroxypivalate, peroxydicarbonates, e.g., di-n-propyl peroxydicarbonate, diisopropyl peroxydicarbonate, di-sec-butyl peroxydicarbonate, bis(4-t-butylcyclohexyl) peroxydicarbonate, di-2-ethoxyethyl peroxydicarbonate, di(2-ethylhexyl) peroxydicarbonate, dimethoxybutyl peroxydicarbonate, and di(3-methyl-3-methoxybutylperoxy) dicarbonate, and diacyl peroxides, e.g., 3,3,5-trimethylhexanoyl peroxide, diisobutyryl peroxide, and lauroyl peroxide; and azo compounds such as 2,2'-azobis(2,4-dimethylvaleronitrile) and 2,2'-azobis(4-methoxy-2,4-dimethylvaleronitrile). The term "low-temperature-active radical polymerization catalyst" means an organic compound having a half-value period at 60° C. of 10-300 minutes. One of these polymerization catalysts may be used alone, or two or more thereof may be used in combination.

The amount of the polymerization catalyst to be used varies depending on the kind of the catalyst, and cannot be unconditionally determined. However, the amount thereof may be selected at will in accordance with polymerization rate. For example, in the case of using azobisisobutyronitrile or acetyl peroxide, the amount thereof is preferably 0.001-0.2 parts by weight, more preferably 0.005-0.1 part by weight, per 100 parts by weight of the vinyl ester monomer.

For introducing ethylene into a copolymer, ordinary pressure polymerization of ethylene may be conducted. The amount of ethylene to be introduced can be controlled by changing the pressure of the ethylene. The ethylene pressure varies depending on the desired ethylene content and cannot be unconditionally specified. Usually, however, the ethylene pressure is selected from the range of 2.0-8.0 MPa.

The reaction temperature for the copolymerization reaction varies depending on the polymerization solvent to be used and the pressure, and cannot be unconditionally specified. Usually, however, the copolymerization reaction is conducted at a temperature not higher than the boiling point of the polymerization solvent. The reaction temperature is usually preferably 40-80° C., especially preferably 55-80° C. In case where the reaction temperature is too low, the polymerization requires a prolonged time period and an attempt to shorten the polymerization period necessitates a large amount of the catalyst. Conversely, too high reaction temperatures render the polymerization difficult to control. Too low or too high reaction temperatures are hence undesirable.

The polymerization period, in the case of batch polymerization, is preferably 4-10 hours, more preferably 6-9 hours. In case where the polymerization period is too short, the polymerization temperature needs to be heightened or the catalyst amount needs to be set at a larger value. Conversely, too long polymerization periods are problematic from the standpoint of production efficiency. Too short or too long polymerization periods are hence undesirable. In the case of continuous polymerization, the average period of residence in the polymerization tank is preferably 2-8 hours, more preferably 2-6 hours. In case where the residence period is too short, the polymerization temperature needs to be heightened or the catalyst amount needs to be set at a larger value. Conversely, too long polymerization periods are problematic from the standpoint of production efficiency. Too short or too long residence periods are hence undesirable.

The conversion into polymer of the vinyl ester monomer is set at a value as high as possible so long as control of the polymerization is possible, from the standpoint of production efficiency. The conversion into polymer thereof is preferably 30-60%. In case where the conversion into polymer thereof is too low, there are problems, for example, in that the production efficiency is low and the vinyl ester monomer remains unpolymerized in a large amount. Conversely, in case where the conversion into polymer thereof is too high, it is difficult to control the polymerization. Too low or too high conversions are hence undesirable.

[Ethylene-Vinyl Alcohol Copolymer]

The ethylene-vinyl ester copolymer thus obtained is saponified to obtain the ethylene-vinyl alcohol copolymer of the invention. Usually, the ethylene-vinyl alcohol copolymer, which is a product of saponification of the ethylene-vinyl ester copolymer, mainly includes ethylene structural units and vinyl alcohol structural units. In some cases, the ethylene-vinyl alcohol copolymer contains a slight amount of vinyl ester structural units remaining unsaponified.

<Saponification Catalyst>

As a saponification catalyst for the saponification reaction, an alkali metal alkoxide may be used. Examples thereof include sodium alkoxides, such as sodium methoxide and sodium ethoxide, and potassium t-butoxide. One of these may be used alone, or two or more thereof may be used in combination. Of these, sodium alkoxides are preferred from the standpoint of saponification efficiency. In particular, it is preferred to use sodium methoxide because methanol is usually used both as the polymerization solvent and as a saponification solvent.

The amount of the saponification catalyst to be used is suitably selected in accordance with the method of saponification, the desired degree of saponification, etc. In the case of using sodium methoxide, the suitable amount thereof is usually 0.001-100 equivalents, preferably 0.003-50 equivalents, to the total amount of the monomers including the vinyl ester monomer.

The process of the invention for producing the ethylene-vinyl alcohol copolymer is characterized in that the saponification reaction is conducted in a nonaqueous system. In order to conduct the saponification reaction in a nonaqueous system, the ethylene-vinyl ester copolymer obtained above is subjected, in the state of having been dissolved in an alcohol solvent containing substantially no water, to the saponification reaction. The expression "containing substantially no water" means that the solvent has a water content of 0% by weight or the solvent unavoidably contains water in an amount of 0.1% by weight or less, as stated above.

By conducting the saponification reaction in the presence of an alcohol solvent containing substantially no water, the polymer-terminal carboxylic acid is efficiently esterified while preventing the carboxylic acid ester groups which are already present from being hydrolyzed. Thus, an ethylene-vinyl alcohol copolymer having carboxylic acid ester groups at polymer terminals can be obtained.

Examples of the alcohol solvent to be used for the saponification reaction include methanol and ethanol. Preferred of these is methanol, because the by-product ester is easy to distill off in cases when the by-product is a methanol ester having a low boiling point.

With respect to methods for the saponification, use can be made of any of batch saponification, continuous saponification on a belt, and tower-process continuous saponification, in accordance with the desired degree of saponification, etc. It is preferred to use tower-process saponification performed at a given elevated pressure, because this method has advantages, for example, in that the amount of the catalyst to be used for the saponification can be reduced and the saponification reaction is apt to proceed highly efficiently.

The pressure during the saponification varies depending on the desired ethylene content, and cannot be unconditionally specified. However, the pressure may be selected from the range of from ordinary pressure to 1.0 MPa. The saponification temperature is 50-180° C., preferably 70-150° C. The saponification period is selected from the range of 1-5 hours.

Thus, the ethylene-vinyl alcohol copolymer (EVOH resin) of the invention is obtained. In the present invention, the EVOH resin obtained is not particularly limited in the degree of saponification and melt flow rate (MFR) (210° C., load, 2,160 g) thereof.

In the EVOH resin, the degree of saponification of the vinyl ester component is usually 90% by mole or higher, preferably 93-99.99% by mole, especially preferably 98-99.99% by mole. In case where the degree of saponification thereof is too low, the EVOH resin tends to be reduced in gas barrier property and melt moldability. Too low degrees of saponification thereof are hence undesirable.

The degree of saponification of the vinyl ester component can be determined, for example, in accordance with JIS K6726 (1994) (the EVOH resin is examined in the state of an even solution thereof in a water/methanol solvent).

The melt flow rate (MFR) (210° C.; load, 2,160 g) of the EVOH resin is usually 1-100 g/10 min, preferably 2-50 g/10 min, especially preferably 3-30 g/10 min. In case where the MFR thereof is too high, this EVOH resin tends to give molded objects having impaired mechanical strength. In case where the MFR thereof is too low, this EVOH resin tends to show impaired extrudability during molding.

The ethylene-vinyl alcohol copolymer of the invention has carboxylic acid ester group at polymer terminal thereof, and the content thereof is as shown hereinabove.

The ethylene-vinyl alcohol copolymer of the invention may have carboxylic acid group, carboxylic acid salt group, e.g., sodium carboxylate, and lactone ring group at polymer terminal thereof.

The ethylene-vinyl alcohol copolymer of the invention may further contain structural units derived from the following comonomers. The comonomers include α-olefins such as propylene, isobutene, α-octene, α-dodecene, and α-octadecene, hydroxyl-containing α-olefins such as 3-buten-1-ol, 4-penten-1-ol, and 3-butene-1,2-diol, hydroxyl-containing α-olefin derivatives such as products of esterification or acylation of these hydroxyl-containing α-olefins, hydroxyalkylvinylidenes such as 2-methylenepropane-1,3-diol and 3-methylenepentane-1,5-diol, hydroxyalkylvinylidene diacetates such as 1,3-diacetoxy-2-methylenepropane, 1,3-dipropionyloxy-2-methylenepropane, and 1,3-dibutyryloxy-2-methylenepropane, unsaturated carboxylic acids or salts, partial or complete alkyl esters, nitriles, amides, or anhydrides of the acids, unsaturated sulfonic acids or salts thereof, vinylsilane compounds, vinyl chloride, and styrene. One of these can be used alone, or two or more thereof can be used in combination.

The ethylene-vinyl alcohol copolymer of the invention can be used as such. However, compounding ingredients generally incorporated into EVOH resins may have been incorporated into the ethylene-vinyl alcohol copolymer of the invention so long as the effects of the invention are not lessened thereby. Examples of the compounding ingredients include heat stabilizers, antistatic agents, colorants, ultraviolet absorbers, lubricants, plasticizers, light stabilizers, surfactants, antibacterials, drying agents, antiblocking agents, flame retardants, crosslinking agents, hardeners, blowing agents, nucleators, antifogging agents, additives for biodegradation, silane coupling agents, and oxygen absorbers.

As the heat stabilizers, additives may be added for the purpose of improving various properties including the thermal stability during melt molding.

It is especially preferred to add any of acetic acid, boron compounds including boric acid and salts thereof; acetic acid salts, and phosphoric acid salts. Examples of these salts include alkali metal salts (sodium, potassium, etc.), alkaline-earth metal salts (calcium, magnesium, etc.), and zinc salts.

In the case of adding acetic acid, the addition amount thereof, per 100 parts by weight of the EVOH resin, is usually 0.001-1 part by weight, preferably 0.005-0.2 parts by weight, especially preferably 0.010-0.1 part by weight. In case where the addition amount of acetic acid is too small, the effect of the inclusion of acetic acid tends not to be sufficiently obtained. Conversely, in case where the addition amount thereof is too large, an even film tends to be difficult to obtain.

In the case of adding a boron compound, the addition amount thereof; in terms of boron amount (determine by ashing and subsequent analysis by ICP emission spectroscopy) per 100 parts by weight of the EVOH resin, is usually 0.001-1 part by weight, preferably 0.002-0.2 parts by weight, especially preferably 0.005-0.1 part by weight. Too small addition amounts of the boron compound may result in cases where the effect of addition of the boron compound is not sufficiently obtained. Conversely, too large amounts thereof tend to make it difficult to obtain an even film.

The amount of an acetic acid salt or phosphoric acid salt (including phosphoric acid hydrogen salt) to be added, in terms of metal amount (determine by ashing and subsequent analysis by ICP emission spectroscopy) per 100 parts by weight of the EVOH resin, is usually 0.0005-0.1 part by weight, preferably 0.001-0.05 parts by weight, especially preferably 0.002-0.03 parts by weight. Too small addition amounts thereof may result in cases where the effect of inclusion thereof is not sufficiently obtained. Conversely, too large amounts thereof tend to make it difficult to obtain an even film. In the case of adding two or more salts to the EVOH resin, the total amount thereof is preferably in the addition amount range shown above.

Methods for adding a heat stabilizer, such as acetic acid, a boron compound, an acetic acid salt, or a phosphoric acid salt, to the EVOH resin are not particularly limited. Preferred examples thereof include: i) a method in which a porous precipitate of the EVOH resin which has a water content of 20-80% by weight is brought into contact with an aqueous solution of the additive to incorporate the additive into the porous EVOH resin, which is then dried; ii) a method which includes introducing the additive into an even solution (water/alcohol solution, etc.) of the EVOH resin, extruding the resultant mixture into strands and introducing the strands into a coagulating liquid, subsequently cutting the obtained strands to obtain pellets, and drying the pellets; iii) a method in which the EVOH resin is mixed with additives en bloc and the mixture is melt-kneaded with an extruder or the like; and iv) a method in which during production of the EVOH resin, the alkali (sodium hydroxide, potassium hydroxide, etc.) used in the saponification step is neutralized with an organic acid, e.g., acetic acid, and the amount of the remaining organic acid, e.g., acetic acid, and of the by-product salt is regulated by water washing.

Preferred from the standpoint of more remarkably obtaining the effects of the invention are methods i) and ii), which are excellent in terms of the dispersibility of the additive(s). In the case of incorporating an organic acid and a salt thereof method iv) is preferred.

<Applications of the EVOH Resin>

The thus-obtained EVOH resin of the invention can be formed by melt molding into, for example, films, sheets, cups, bottles, etc. Mainly used as methods for the melt molding are extrusion molding methods (T-die extrusion, inflation extrusion, blow molding, melt spinning, profile extrusion, etc.) and injection molding methods. Usually, a melt molding temperature is frequently selected from the range of 150-300° C.

Although such molded objects may be used as such in various applications, the molded objects are usually laminated with other base materials in order to further enhance the strength or impart other functions, thereby obtaining laminates.

Thermoplastic resins are useful as such other base materials. Examples of the thermoplastic resins include polyolefins such as polyethylenes, e.g., linear low-density polyethylene, low-density polyethylene, ultralow-density polyethylene, medium-density polyethylene, and high-density polyethylene, polypropylene, ethylene-propylene (block and random) copolymers, propylene/α-olefin (α-olefin having 4-20 carbon atoms) copolymers, polybutene, and polypentene, graft polyolefins obtained by graft-modifying these polyolefins with an unsaturated carboxylic acid or an ester thereof, ionomers, ethylene-vinyl acetate copolymers, ethylene-acrylic acid copolymers, ethylene-acrylic ester copolymers, polyester resins, polyamide resins (including copolyamides), poly(vinyl chloride), poly(vinylidene chloride), acrylic resins, polystyrene, vinyl ester resins, polyester elastomers, polyurethane elastomers, halogenated polyolefins such as chlorinated polyethylene and chlorinated polypropylene, aromatic or aliphatic polyketones, and polyalcohols obtained by reducing these polymers. Preferred from the standpoint of suitability for practical use, such as the material properties (in particular, strength) of the laminates, are polyolefin resins and polyamide resins. It is especially preferred to use polyethylenes and polypropylene.

These base resins may contain conventionally known ingredients such as antioxidants, antistatic agents, lubricants, nucleators, antiblocking agents, ultraviolet absorbers, and waxes, so long as the inclusion thereof is not counter to the spirit of the invention.

In laminating the EVOH resin of the invention with other base materials, the laminating can be conducted by a known method. Examples of laminating methods include: a method in which another base material is laminated to a film, sheet, or the like of the EVOH resin of the invention by melt extrusion laminating; a method in which, conversely, the resin is laminated to another base material by melt extrusion laminating; a method in which the resin and another base material are co-extruded; a method in which the resin (layer) and another base material (layer) are dry-laminated to each other using a known adhesive such as an organotitanium compound, isocyanate compound, polyester compound, or polyurethane compound; and a method in which a solution of the resin is applied to another base material and the solvent is then removed.

Of these, the method in which the materials are co-extruded is preferred from the standpoints of cost and environment.

Layer configurations of such laminate may be as follows. In cases when a layer including the EVOH resin of the invention is expressed by a (a1, a2, . . . ) and a layer including a thermoplastic resin is expressed by b (b1, b2, . . . ), possible configurations include not only the two-layer structure of a/b, but also any desired combinations such as, for example, b/a/b, a/b/a, a1/a2/b, a/b1/b2, b2/b1/a/b1/b2, and b2/b1/a/b1/a/b1/b2. Furthermore, in cases when a recycle layer including a mixture of the EVOH resin and a thermoplastic resin and obtained by re-melting and re-molding, for example, the trimmings and defectives generated during the production of the laminate is expressed by R, possible configurations include b/R/a, b/R/a/b, b/R/a/R/b, b/a/R/a/b, and b/R/a/R/a/R/b.

In the layer configurations shown above, a layer of an adhesive resin can be disposed between the layers according to need. As the adhesive resin, a known one may be used. Such adhesive resins vary depending on the kind of the resin b, and an appropriate one may hence be suitably selected. However, representative examples thereof include a carboxyl-containing modified olefin polymer obtained by chemically bonding an unsaturated carboxylic acid or the anhydride thereof to a polyolefin resin by addition reaction, grafting reaction, etc. Examples thereof include polyethylene graft-modified with maleic anhydride, polypropylene graft-modified with maleic anhydride, ethylene-propylene (block and random) copolymers graft-modified with maleic anhydride, ethylene-ethyl acrylate copolymers graft-modified with maleic anhydride, and ethylene-vinyl acetate copolymers graft-modified with maleic anhydride. One polymer selected from among these or a mixture of two or more thereof is preferred. These adhesive resins can be blended with an EVOH composition, another EVOH resin, or a rubber or elastomer ingredient such as polyisobutylene or an ethylene-propylene rubber, or with the resin of layer b. In particular, blending with a polyolefin resin different from the polyolefin resin used as the base of the adhesive resin is useful because this blending may improve the adhesiveness.

The laminate described above is subjected to a (hot) stretching treatment according to need. The term "(hot) stretching treatment" means an operation in which a laminate in the form of a film or sheet that has been evenly heated thermally is evenly formed into the shape of a tube or film by means of chucks, a plug, vacuum, air pressure, blowing, etc. The stretching may be either uniaxial stretching or biaxial stretching. In the case of biaxial stretching, the stretching may be either simultaneous stretching or sequential stretching.

As a stretching method, use can be made of one which is high in stretch ratio and is selected from among a roll stretching method, tenter stretching method, tubular stretching method, stretch blowing method, vacuum/air-pressure forming, and the like. In the case of biaxial stretching, either a simultaneous biaxial stretching mode or a sequential biaxial stretching mode can be employed. The stretching temperature is selected from the range of usually about 40-170° C., preferably about 60-160° C. In case where the stretching temperature is too low, the stretchability is poor. In case where the stretching temperature is too high, it is difficult to maintain a stable stretched state.

After the stretching, thermal fixing may be successively performed for the purpose of imparting dimensional stability. The thermal fixing can be conducted by a known means. For example, the stretched film is heat-treated at usually 80-180° C., preferably 100-165° C., usually for about 2-600 seconds while keeping the film in the stretched state.

In the case where the multilayered stretched film obtained from the EVOH resin of the invention is to be used as a shrink film, the thermal fixing is omitted and the stretched film is subjected, for example, to a treatment in which cold air is blown against the stretched film to perform cold fixing, in order to impart thermal shrinkability thereto.

The thicknesses of the thermoplastic resin layer(s) and adhesive resin layer(s) of the laminate vary depending on the layer configuration, kind of the thermoplastic resin, kind of the adhesive resin, uses, package form, required properties, etc., and cannot be unconditionally specified. However, the thickness of each thermoplastic resin layer is selected from the range of usually about 10-1,000 μm, preferably about 50-500 μm, and the thickness of each adhesive resin layer is selected from the range of usually about 5-500 μm, preferably about 10-250 μm.

The thickness of the layer(s) including the EVOH resin of the invention varies depending on the required gas barrier properties, etc. However, the thickness thereof is usually 1-500 μm, preferably 2-250 μm, especially preferably 3-100 μm. In case where the thickness thereof is too small, sufficient gas barrier properties tend not to be obtained. Conversely, in case where the thickness thereof is too large, the film tends to have reduced flexibility.

In cases when the laminate obtained is further coated with another base material by extrusion coating or when a film, sheet, or the like of another base material is laminated to the obtained laminate using an adhesive, then the base material to be used can be any desired base material (e.g., paper, a metal foil, a uni- or biaxially stretched plastic film or sheet, the plastic film or sheet coated with an inorganic compound by vapor deposition, woven fabric, nonwoven fabric, metal felt, or wood) besides the thermoplastic resins enumerated above.

Containers including bags, cups, trays, tubes, bottles, etc. which are constituted of the thus-obtained film, sheet, or stretched film and covers therefor are useful as various kinds of packaging materials or containers not only for general foods but also for seasonings such as mayonnaise and dressing, fermented foods such as miso, fat or oil foods such as salad oil, beverages, cosmetics, medicines, etc.

EXAMPLES

The present invention is explained below in more detail by reference to Examples, but the invention should not be construed as being limited to the following Examples unless the invention departs from the spirit thereof.

In the following Examples and Comparative Example, "parts" is by weight unless otherwise indicated.

Example 1

[Production of Ethylene-Vinyl Acetate Copolymer]

Using a polymerization vessel equipped with a stirrer, ethylene was reacted with vinyl acetate under the following conditions to produce a copolymer by continuous polymerization.

(Polymerization Conditions)

| | |
|---|---|
| Feed rate of vinyl acetate having oxygen concentration adjusted to 1 ppm | 100 parts/hr |
| Feed rate of methanol | 14 parts/hr |
| Feed rate of peroxyester (polymerization catalyst) | 0.008 parts/hr |
| Polymerization temperature | 61° C. |
| Ethylene pressure | 3.6 MPa |
| Average residence period | 4 hr |

The ethylene-vinyl acetate copolymer thus obtained had an ethylene content of 29% by mole, and the conversion into polymer of the vinyl acetate was 38%.

[Production of EVOH Resin]

The methanol used in the following production was methanol having a concentration of 100%.

A hundred parts of a methanol solution containing the ethylene-vinyl acetate copolymer in a concentration of 50% was introduced into a jacketed reaction vessel. To this reaction vessel were supplied 150 parts of methanol and 10 parts of a methanol solution containing sodium methoxide in an amount of 25 equivalents to the vinyl acetate groups of the copolymer. A saponification reaction was conducted for 30 minutes at ordinary pressure and a jacket temperature kept at 80-90° C., while methanol vapor containing methyl acetate was being distilled off through an upper part of the reaction vessel. Thereafter, 150 parts of methanol was introduced into the reaction vessel, and the remaining methyl acetate was distilled off together with methanol vapor through the upper part of the reaction vessel.

Subsequently, 150 parts of methanol and 10 parts of a methanol solution containing sodium methoxide in an amount of 25 equivalents to the vinyl acetate of the copolymer were supplied again, and a 30-minute saponification reaction was conducted in the same manner. Thereafter, 150 parts of methanol was further added. The remaining methyl acetate was distilled off together with methanol vapor through the upper part of the reaction vessel, and 1.3 parts of acetic acid was then introduced to terminate the saponification reaction. The resultant methanol solution of an ethylene-vinyl alcohol copolymer (a product of saponification of the ethylene-vinyl acetate copolymer, degree of saponification, 99.2% by mole) had a resin concentration of 20%. Next, some of the methanol was distilled off while bubbling water vapor into the methanol solution until the resultant methanol/water solution of the ethylene-vinyl alcohol copolymer came to have a resin concentration of 35%. Thus, a completely transparent, homogeneous methanol/water solution was obtained.

Subsequently, the obtained methanol/water solution of the ethylene-vinyl alcohol copolymer was extruded into strands and introduced into cold water. The strands obtained (hydrous porous object) were cut with a cutter to obtain porous pellets of the EVOH resin, the porous pellets having a diameter of 3.8 mm, a length of 4 mm, and a resin content of 35%.

A hundred parts of the porous pellets obtained were washed for 1 hour with 250 parts of treating water containing both 0.08 parts of sodium acetate and 0.05 parts of acetic acid. The treating water was replaced with fresh one to repeat the washing. Thus, the washing was conducted seven times in total. Subsequently, the porous pellets obtained were dried at 120° C. for 8 hours in a nitrogen stream having an oxygen concentration of 0.5% or less, thereby obtaining EVOH resin composition pellets containing volatile matter in an amount of 0.17 parts per 100 parts of the EVOH resin. This EVOH resin had an MFR of 3.8 g/10 min (210° C.; load, 2,160 g).

<Measurement of Melting Point of the EVOH Resin>

The melting point of the EVOH resin obtained was measured with a differential scanning calorimeter (trade name "Pyris 1", manufactured by PerkinElmer, Inc.) at a heating rate of 10° C./min. The results thereof are shown in Table 1.

<Ascertainment of Structure of the EVOH Resin>

(1-1) Determination of Terminal Methyl Group Content

The EVOH resin obtained was examined by $^1$H-NMR spectroscopy (solvent, heavy dimethyl sulfoxide (DMSO-D6); examined at 50° C.) using examination apparatus "400 MHz NMR" (manufactured by Bruker Biospin K.K.). The $^1$H-NMR chart obtained is shown in FIG. 1.

The content of terminal methyl groups was calculated using the following equation 1 from the following integrals of peaks shown in FIG. 1: the integral ($I_{Me-1}$) of a peak of terminal methyl groups at 0.7-0.95 ppm; the integral ($I_{CH2}$) of peaks of non-terminal methylene (sum of the methylene groups of ethylene units, vinyl alcohol units, and vinyl acetate units) at 0.95-1.85 ppm; the integral ($I_{OAc}$) of a peak of the terminal methyl groups in vinyl acetate units at 1.9-2 ppm; and the integral ($I_{CH}$) of a peak of the methine in vinyl alcohol units at 3.1-4.3 ppm.

These integrals ($I_{Me-1}$), ($I_{CH2}$), ($I_{OAc}$), and ($I_{CH}$) respectively relate to the peak assigned to terminal methyl, the peaks assigned to non-terminal methylene, the peak assigned to the terminal methyl in vinyl acetate units, and the peak assigned to the methine in vinyl alcohol units.

Content of terminal methyl groups (% by mole)=
$(I_{Me-1}/3)/[(I_{Me-1}/3)+(I_{OAc}/3)+I_{CH}+\{I_{CH2}-2\times I_{CH}-2\times(I_{OAc}/3)-2\times(I_{Me-1}/3)\}/4]$ (Equation 1)

(1-2) Determination of Carboxylic Acid Methyl Ester Group Content (Y)

The EVOH resin obtained was examined by $^1$H-$^{13}$C HSQC spectroscopy (solvent, heavy DMF/heavy water=70/30 (by weight)) using examination apparatus "400 MHz NMR" (manufactured by Bruker Biospin K.K.). The two-dimensional NMR chart obtained is shown in FIG. 2.

In FIG. 2: <1> and <2> are correlation peaks assigned to terminal lactone ring groups; <3> and <4> are correlation peaks assigned to terminal methyl carboxylate groups; <5> is a correlation peak assigned to terminal carboxylic acid groups; and <6> is a correlation peak assigned to terminal sodium carboxylate groups. The presence of terminal carboxylic acid methyl ester groups was ascertained from FIG. 2.

Next, the content of carboxylic acid methyl ester groups (Y) was calculated from the terminal methyl group content (% by mole) obtained in (1-1) above, using a $^1$H-NMR chart (see FIG. 3) obtained by $^1$H-NMR spectroscopy (solvent, heavy DMF/heavy water=70/30 (by weight); examined at 80° C.). (The chemical shift values were based on the 0-ppm peak of TMS.)

Specifically, the content of carboxylic acid methyl ester groups (Y) (% by mole) was calculated using the following equation 2 from the integral ($I_{Me-2}$) of a peak of terminal methyl groups at 0.7-1 ppm, the integral ($I_y$) of a peak at 2.30-2.48 ppm, and the integral ($I_x$) of a peak at 2.48-2.65 ppm.

These integrals ($I_{Me-2}$), ($I_x$), and ($I_y$) respectively relate to the peak assigned to terminal methyl, the peak assigned to lactone ring groups, and the peaks assigned to lactone ring groups and carboxylic acid methyl ester groups.

Content of carboxylic acid methyl ester groups (Y) (% by mole)=[content of terminal methyl groups (% by mole)]$\times[(I_y-I_x/2)/2]/(I_{Me-2}/3)$ (Equation 2)

(1-3) Determination of Content of Carboxylic Acid Methyl Ester Groups (Q) Based on the Sum (P) of Content of Carboxylic Acid Methyl Ester Groups (Y), Content of Carboxylic Acid Groups (Z), Content of Sodium Carboxylate Groups (W), and Content of Lactone Ring Groups (X)

The content of carboxylic acid methyl ester groups (Q) based on the sum (P) was calculated using a $^1$H-NMR chart (see FIG. 3) obtained by examining the obtained EVOH resin by $^1$H-NMR spectroscopy (solvent, heavy DMF/heavy water=70/30 (by weight); examined at 80° C.) with examination apparatus "400 MHz NMR" (manufactured by Bruker Biospin K.K.). (The chemical shift values are based on the 0-ppm peak of TMS.) Specifically, the content (Q) (% by mole) of carboxylic acid methyl ester groups (Y) based on the sum (P) of the carboxylic acid methyl ester groups (Y), carboxylic acid groups (Z), sodium carboxylate groups (W), and lactone ring groups (X) was calculated using the following equation 3 from the integral ($I_y$) of a peak at 2.30-2.48 ppm, the integral ($I_z$) of a peak at 2.22-2.30 ppm, the integral ($I_w$) of a peak at 2.1-2.22 ppm, and the integral ($I_x$) of a peak at 2.48-2.65 ppm.

These integrals ($I_y$), ($I_z$), ($I_w$), and ($I_x$) respectively relate to the peaks assigned to carboxylic acid methyl ester groups and lactone ring groups, the peak assigned to carboxylic acid groups, the peak assigned to sodium carboxylate groups, and the peak assigned to lactone ring groups.

Content of carboxylic acid methyl ester groups $Q$ (% by mole) based on the sum $(P)=[(I_y-I_x/2)/2]/[I_x/2+(I_y-I_x/2)/2+I_z/2+I_w/2]$ (Equation 3)

The content of carboxylic acid groups (Z) based on the sum (P), the content of sodium carboxylate groups (W) based on the sum (P), and the content of lactone ring groups (X) based on the sum (P) were determined from the values for the respective peaks obtained in (1-3) above.

The results obtained in (1-1) to (1-3) above are shown in Table 1.

Example 2

An ethylene-vinyl acetate copolymer was produced in the same manner as in Example 1, except that the amount of the sodium methoxide to be introduced for the saponification was changed to 50 equivalents, the amount of the sodium methoxide to be supplied secondly was changed to 50 equivalents, and the amount of the acetic acid to be used for terminating the saponification reaction was changed to 2.5 parts.

The melting point of the EVOH resin was measured, and the terminal methyl ester group content, the carboxylic acid methyl ester group content, and the content of the carboxylic acid methyl ester groups based on the total content of the carboxylic acid methyl ester groups, carboxylic acid groups, sodium carboxylate groups, and lactone ring groups were determined, in the same manners as in Example 1. The results thereof are shown in Table 1.

Comparative Example 1

An ethylene-vinyl acetate copolymer was produced in the same manner as in Example 1, except that the sodium methoxide to be supplied for the saponification reaction was replaced with sodium hydroxide, the sodium methoxide to be supplied secondly was replaced with sodium hydroxide, and the termination of the saponification reaction by the addition of acetic acid was omitted.

The melting point of the EVOH resin was measured in the same manner as in Example 1.

Figure 4:
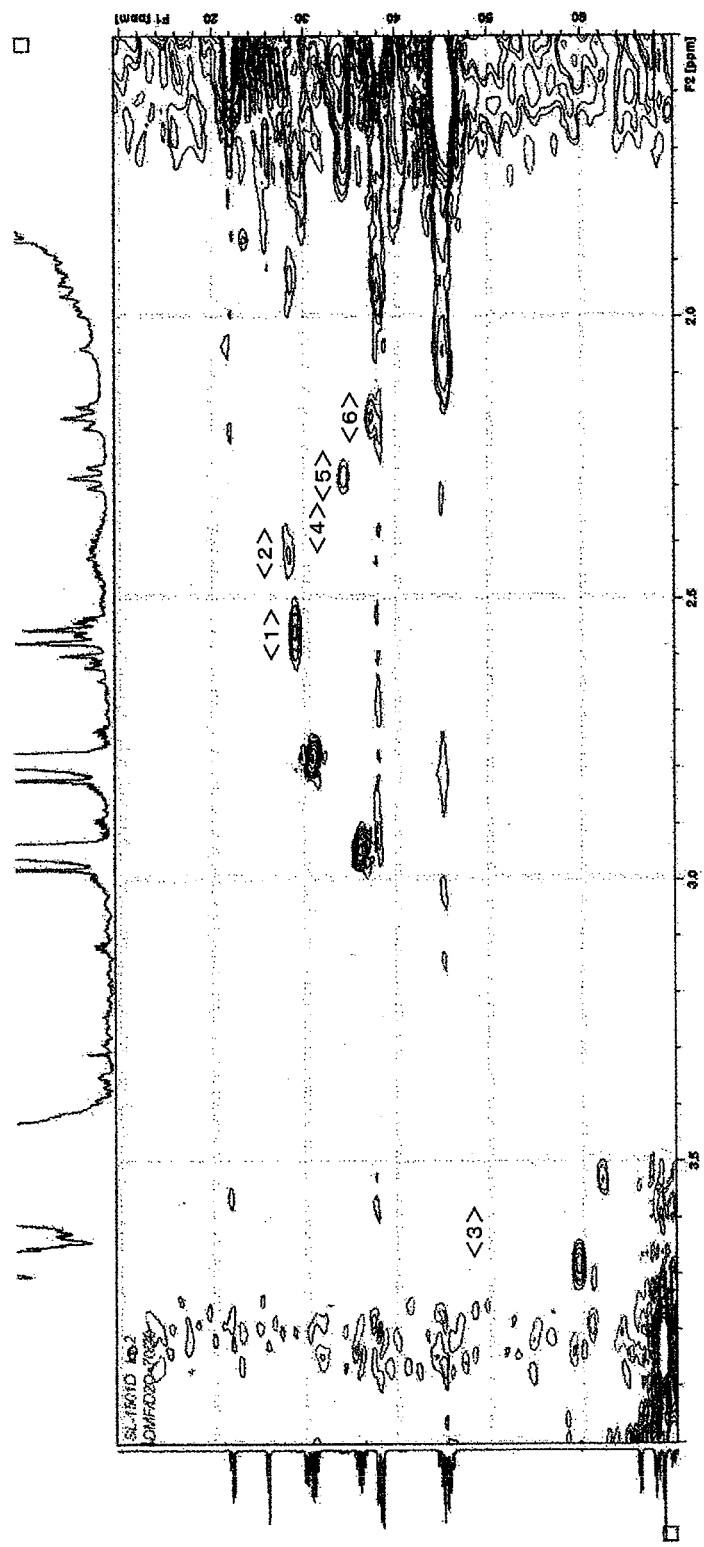
FIG. 4 shows a $^1$H-$^{13}$C HSQC chart (solvent: heavy dimethylformamide (DMF)/heavy water=70/30) of the EVOH resin obtained in Comparative Example 1.

Furthermore, in the same manner as in (1-2) above, the EVOH resin obtained was examined by $^1H$-$^{13}C$ HSQC spectroscopy (solvent, heavy DMF/heavy water=70/30 (by weight)) using examination apparatus "400 MHz NMR" (trade name; manufactured by Bruker Biospin K.K.). The two-dimensional NMR chart obtained is shown in FIG. 4. The NMR chart of FIG. 4 had no correlation peak in either of the positions corresponding to the <3> and <4> in Example 1. It was thus ascertained that there was no terminal carboxylic acid methyl ester group. The carboxylic acid methyl ester group content (Y) was hence regarded as 0% by mole.

The results obtained are shown in Table 1.

TABLE 1

| | Structure (mol %) | | | Carboxylic acid methyl ester group content (mol %) | Proportion to total amount of polymer-terminal carboxylic acid ester groups, carboxylic acid groups, carboxylic acid salt groups, and lactone ring groups (mol %) | | | | Results of differential scanning calorimetry (DSC) |
|---|---|---|---|---|---|---|---|---|---|
| | Saponification catalyst | Neutralization with acid | Et. con. | Degree of saponification (%) | | Carboxylic acid methyl ester groups | Lactone ring groups | Carboxylic acid groups | Sodium carboxylate groups | Melting point (° C.) |
| Example 1 | NaOMe | performed | 28.9 | 99.2 | 0.05 | 18 | 50 | 15 | 17 | 185.9 |
| Example 2 | NaOMe | performed | 28.8 | 99.2 | 0.05 | 17 | 49 | 16 | 18 | 186.2 |
| Comparative Example 1 | NaOH | not performed | 29.0 | 99.2 | 0 | 0 | 54 | 18 | 28 | 188.3 |

*"Me" in the table indicates methyl group.

The results given in Table 1 show that Examples 1 and 2 were lower in melting point (Tm), measured by differential scanning calorimetry, by at least 2° C. than Comparative Example 1. Consequently, the EVOH resins of Examples 1 and 2 can be melt-molded at lower temperatures than before and can hence be inhibited from thermally deteriorating during melt molding and from taking a color. It is presumed that since the polymer terminals include carboxylic acid ester groups, the crystallization of the EVOH resins is affected little and these EVOH resins give molded objects having intact gas barrier properties.

While the invention has been described in detail and with reference to specific embodiments thereof, it will be apparent to one skilled in the art that various changes and modifications can be made therein without departing from the spirit and scope thereof. This application is based on a Japanese patent application filed on Dec. 25, 2015 (Application No. 2015-254698), the contents thereof being incorporated herein by reference.

INDUSTRIAL APPLICABILITY

The film including the ethylene-vinyl alcohol copolymer of the invention has excellent melt moldability and is extremely useful industrially.

The invention claimed is:
1. An ethylene-vinyl alcohol copolymer comprising:
a polymer terminal carboxylic acid ester group, and at least one polymer terminal carboxylic acid group, carboxylic acid salt group, or lactone ring group, wherein a content of the polymer terminal carboxylic acid ester group is 5-less than 20% by mole based on a total amount of polymer terminal carboxylic acid ester groups, carboxylic acid groups, carboxylic acid salt groups, and lactone ring groups;
wherein the carboxylic acid ester group does not include a cyclic ester group, and
the degree of saponification is 98% by mole or more;
wherein a content of the carboxylic acid ester group is 0.01-0.2% by mole based on a total amount of monomer units in the copolymer.

2. The ethylene-vinyl alcohol copolymer according to claim 1, wherein the carboxylic acid ester group is a carboxylic acid alkyl ester group.

3. A process for producing an ethylene-vinyl alcohol copolymer, comprising:
   copolymerizing ethylene and a vinyl ester monomer to obtain a copolymer and
   performing a saponification reaction in a nonaqueous system using a saponification catalyst,
   wherein performing the saponification reaction employs an alkali metal alkoxide as the saponification catalyst;
   wherein performing the saponification reaction is conducted in the presence of an alcohol solvent containing no water;
   and thereby obtaining an ethylene-vinyl alcohol copolymer comprising:
   a carboxylic acid ester group at a polymer terminal; wherein
   the carboxylic acid ester group does not include a cyclic ester group, and
   the degree of saponification is 98% by mole or more.

4. An ethylene-vinyl alcohol copolymer comprising:
   a polymer terminal carboxylic acid salt group, and at least one polymer terminal carboxylic acid group, carboxylic acid ester group, or lactone ring group, wherein a content of the polymer terminal carboxylic acid salt group is 5-20% by mole based on a total amount of polymer terminal carboxylic acid ester groups, carboxylic acid groups, carboxylic acid salt groups, and lactone ring groups;
   wherein the carboxylic acid ester group does not include a cyclic ester group, and
   the degree of saponification is 98% by mole or more;
   wherein a content of the carboxylic acid ester group is 0.01-0.2% by mole based on a total amount of monomer units in the copolymer.

* * * * *

UNITED STATES PATENT AND TRADEMARK OFFICE
CERTIFICATE OF CORRECTION

PATENT NO. : 11,225,537 B2
APPLICATION NO. : 16/065323
DATED : January 18, 2022
INVENTOR(S) : N. Sato Page 1 of 1

It is certified that error appears in the above-identified patent and that said Letters Patent is hereby corrected as shown below:

On the Title Page

Column 1, insert -- (30) Foreign App. Priority Data 2015-254698 JP 2015-12-25 --.

Signed and Sealed this
Eleventh Day of October, 2022

Katherine Kelly Vidal
*Director of the United States Patent and Trademark Office*